United States Patent [19]
Miyazaki et al.

[11] Patent Number: 5,216,587
[45] Date of Patent: Jun. 1, 1993

[54] INVERTER

[75] Inventors: Hideki Miyazaki; Kouzou Watanabe; Kenichi Onda; Tomoyuki Tanaka, all of Hitachi; Masayuki Wada, Katsuta, all of Japan

[73] Assignee: Hitachi, Ltd., Tokyo, Japan

[21] Appl. No.: 862,363

[22] Filed: Apr. 2, 1992

[30] Foreign Application Priority Data

Apr. 5, 1991 [JP] Japan .................................. 3-072773

[51] Int. Cl.⁵ .......................................... H02H 7/122
[52] U.S. Cl. ........................................ 363/56; 363/98; 363/132
[58] Field of Search ................. 363/56, 58, 98, 132; 361/91, 111

[56] References Cited
U.S. PATENT DOCUMENTS 4,633,381 12/1986 Upadhyay .............................. 363/56
4,970,620 11/1990 Lehnhoff et al. ...................... 363/56

OTHER PUBLICATIONS

Denshi gijutsu (Electronic Technology Nov., 1986, p. 76).
"Motor-Con" Sep., 1987 Proceedings, Semiconductors and Step Motors Direction for Growth, Thomas Hopkins pp. 412-416.

*Primary Examiner*—Steven L. Stephan
*Assistant Examiner*—Adolf Berhane
*Attorney, Agent, or Firm*—Antonelli, Terry, Stout & Kraus

[57] ABSTRACT

An inverter includes first, second, and third dc voltage sources, first and second switching elements which are connected in series to the first dc voltage source, a signal generator section for producing first and second control signals on the basis of the output voltage from the third dc voltage source, first and second signal level converter sections for converting voltage levels of the first and second control signals based on the output voltage from the second dc voltage source and thereby respectively generating first and second output signals, and first and second driver sections responsive to the first and second output signals for supplying the first and second switching element with first and second driving signals on the basis of the output voltage from the second dc voltage source and thereby respectively turning the first and second switching elements on or off. At least either one of the first and second signal level converter sections includes a turn-off section responsive when at least either one of the output voltages respectively from the second and third dc voltage sources is lower than a predetermined voltage level for turning the first or second switching element off irrespective of the first and second control signals.

6 Claims, 8 Drawing Sheets

INVERTER

BACKGROUND OF THE INVENTION

The present invention relates to an inverter for transforming a direct-current (dc) voltage into an alternating-current (ac) voltage.

Conventionally, in an inverter constituted with two power switching elements connected in series to a main power source (dc voltage source), in order to transmit a signal from control instructing means such as a microcomputer to a gate or base driver circuit of each switching element, there has been commonly adopted a method in which insulating means such as a photocoupler or a pulse transformer is arranged therebetween. This is because of necessity of level shift to cope with a floating voltage of a reference potential of the signal to be send to the driver circuit driving the positive side switching element, the reference potential changing from 0 volt to a voltage value of the main power source. Moreover, the control instruction means is insulated from the driver circuit for a high reliability. In regard to the method of transmitting a signal to the driver circuit via such an insulating means, a driver circuit adopting a photocoupler has been shown in FIG. 9 (d) of page 76 of "Denshi Gijutsu (Electronic Technologies)", November, 1986. In this circuit, when a voltage of the driver source power is lower than a predetermined value, a low voltage is developed from a source power operating the coupler. Consequently, the coupler is not turned on and hence a switching element in an output stage is kept remained in an off state. With provision of the driver circuit for the switching element of each of the positive and negative sides, it is possible to prevent, at an initial setup time in which the switching elements are powered, the elements from simultaneously activated to be turned on, thereby avoiding occurrence of a short-circuited state.

Figure 8:
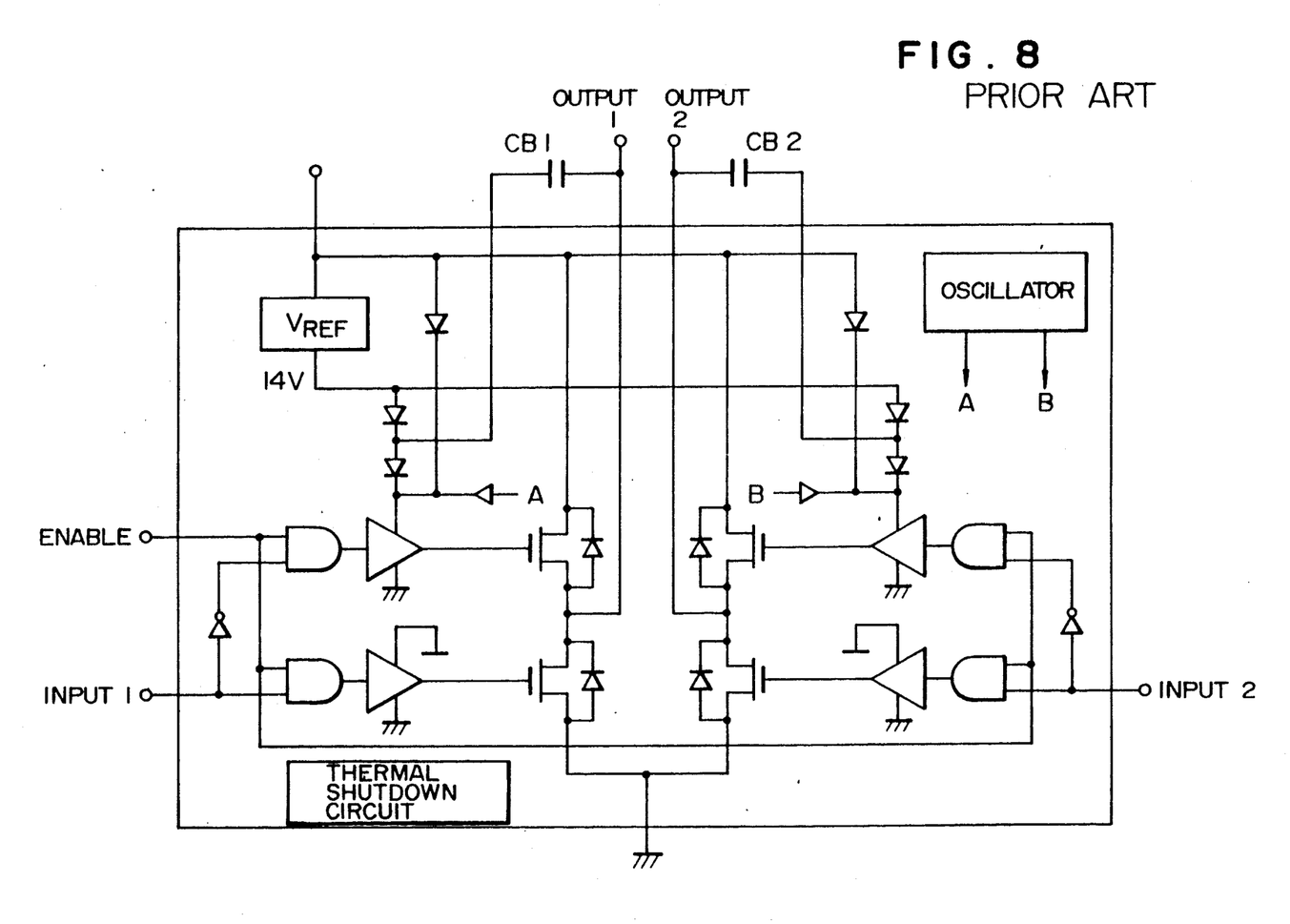
FIG. 8 is a diagram showing the electric circuit structure of a conventional inverter.

There has been recently developed a power integrated circuit (IC) in which power switching elements and driver circuits thereof are formed in an integrated manner. In many cases, the output stage is constituted with inverters. Such an example of inverters formed in the IC structure has been described in pages 412 to 416 of the "MOTOR-CON, September, 1987 Proceedings". FIG. 8 is a block diagram showing the functional configuration of the inverter. In general, in an inverter formed in an integrated circuit structure, the insulating means above are not suitable for the circuit integration and are hence not included in the integrated circuit. Namely, the signal transmission to the driver circuit is accomplished according to a circuitry technique. On the other hand, in order to prevent the switching elements respectively of the positive and negative sides from being simultaneously turned on, an enable terminal is adopted in the example of FIG. 8. Namely, only when an input signal to the enable terminal is set to a high level, the switching elements respectively of the positive and negative sides can be turned on.

SUMMARY OF THE INVENTION

In some cases, however, an inoperable state may occur in any of the logic circuits including those receiving as an input thereto the enable signal if the associated power source voltage is below the predetermined value. This may possibly lead to an erroneous operation in which both of the upper and lower arm switching elements are turned on at the same time. Such an undefined state of logic operations due to a lower voltage of the power supply may take place at a moment when the power source of the logic circuit, namely, the control power source is turned on for its initial operation, when the control power source is instantaneous turned off, or the like. This necessitates countermeasure for prevention of the wrong operation.

It is therefore an object of the present invention to provide an inverter in which the positive and negative sides switching elements are not simultaneously turned on so as to prevent the wrong setup operation thereof in the undefined state of the logic circuit operation, for example, when the inverter is powered.

In order to achieve the object above, there is provided an inverter according to the present invention including a first dc voltage source, a first switching element and a second switching element which are connected in series to the first dc voltage source, a second dc voltage source, a third dc voltage source developing an output voltage less than that produced from the second dc voltage source, a signal generator section for producing a first control signal and a second control signal on the basis of the output voltage from the third dc voltage source, a first signal level converter section for converting a voltage level of the first control signal based on an output voltage from the second dc voltage source and thereby generating a first output signal, a second signal level converter section for converting a voltage level of the second control signal based on the output voltage from the second dc voltage source and thereby generating a second output signal, a first driver section responsive to the first output signal for supplying the first switching element with a first driving signal on the basis of the output voltage from the second dc voltage source and thereby turning the first switching element on or off, and a second driver section responsive to the second output signal for supplying the second switching element with a second driving signal on the basis of the output voltage from the second dc voltage source and thereby turning the second switching element on or off. At least either one of the first and second signal level converter sections includes a turn-off section responsive when at least either one of the output voltages respectively supplied from the second and third dc voltage sources is lower than a predetermined voltage level for turning the first or second switching element irrespective of the first and second control signals.

In the inverter above, like in the conventional inverter, at an initial setup operation of the first or second dc voltage source, at an instantaneous interruption thereof, or the like, the undefined state of logic operations may possibly occur in the generator section and the like. However, in the inverter according to the present invention, the first or second switching element is turned off irrespective of the first and second control signals, thereby preventing an occurrence of a phenomenon in which the first and second switching elements are simultaneously activated to be turned on.

The turn-off section may includes a unit or section responsive when a voltage difference between the output voltages respectively supplied from the second and third dc voltage sources is equal to or less than a first predetermined value for turning the first or second switching element off regardless of the first and second control signals.

At least either one of the first and second signal level converter sections may includes a unit or section responsive when a voltage difference between the output voltages respectively supplied from the second and third dc voltage sources is equal to or more than a second predetermined value for turning the first or second switching element off regardless of the first and second control signals.

In this case, there is obtained the following advantageous effect. Namely, when the voltage difference between the output voltages respectively delivered from the second and third dc voltage sources is equal to or more than the second predetermined value, the first or second switching element is turned off regardless of the first and second control signals. This consequently solves disadvantages as follows. For example, when the output voltage from the second dc voltage source becomes to be higher than an allowable upper-limit value, the inverter stops producing the output therefrom. Consequently, in a case where the output voltage from the second dc voltage source becomes to be higher than the allowable upper-limit value, the first or second driving signal respectively fed to the first or second switching element exceeds an allowable upper-limit value thereof. This leads to deterioration of reliability of the first or second switching element and to an increase in a short-circuit current when a short circuit is formed in the load of the inverter. The disadvantages can be prevented as described above.

The turn-off section includes a MOSFET having a p-type channel and a MOSFET having an n-type channel, these MOSFETs being connected in series to the second dc voltage source. The voltage difference between the output voltages respectively from the second and third dc voltage sources is applied between a gate region and a source region of the MOSFET of the p-type channel and the first or second control signal is applied between a gate region and a source region of the MOSFET of the n-type channel. In this situation, there may be arranged a resistor connected in parallel between a drain region and the source region of the MOSFET of the n-type channel; moreover, an MOSFET may be connected in parallel between the drain and source regions of the MOSFET of the n-type channel.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Figure 1:
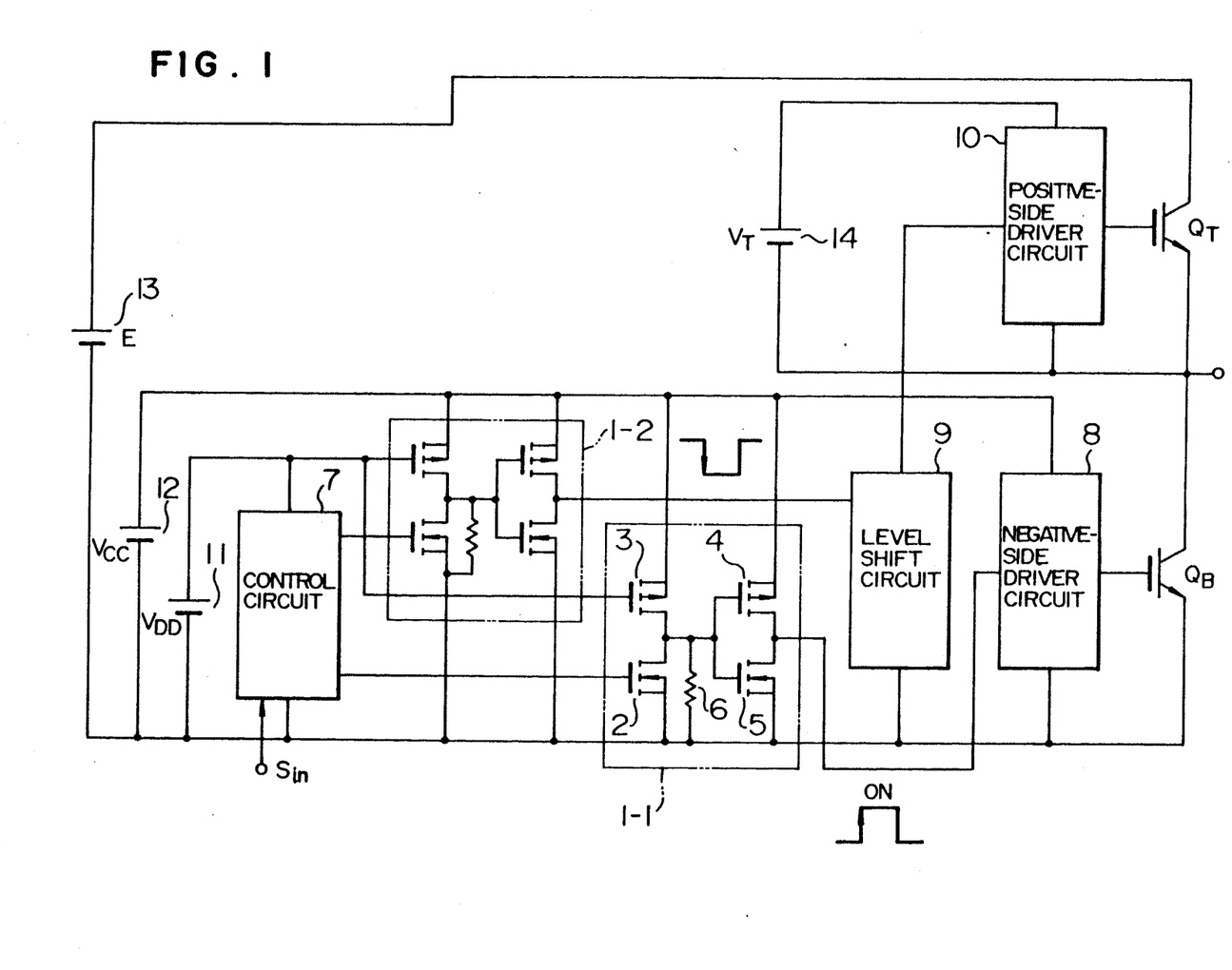
FIG. 1 is a diagram schematically showing the electric circuit constitution of an inverter in an embodiment according to the present invention.

FIG. 1 shows an electric circuit construction of an inverter in an embodiment according to the present invention. In this diagram, an inverter constituted with switching elements $Q_T$ and $Q_B$ is disposed to transform a dc voltage E delivered from a main power source 13 thereto into an ac voltage. The switching elements $Q_T$ and $Q_B$ are respectively controlled by driver circuits 10 and 8 to be turned on or off. In this constitution, a voltage level of an output signal from a signal level converter circuit 1-2 is changed by a level shift circuit 9 to be transmitted to the positive-side driver circuit 10. The switching elements $Q_T$ and $Q_B$ are respectively supplied with voltages from driving power sources 12 and 14. Namely, the associated voltage is applied between a gate region and an emitter region of the pertinent switching element, thereby tuning the element on.

A control circuit (a control signal generator circuit) 7 is powered by a control power source 11 to create a logic signal as a control signal, which turns the elements $Q_T$ and $Q_B$ on according to an input signal Sin supplied from an external device. In this regard, a voltage developed by the control power source 11 is lower than that created by the driving power source 12.

The constituent elements above are generally used in an inverter commonly used. In this embodiment, the logic signal produced from the control circuit 7 to turn the switching elements $Q_T$ and $Q_B$ on is supplied via the signal level converter circuits 1-1 and 1-2 in the circuit constitutions respectively enclosed with broken lines to the driver circuit 8 and the level shift circuit 9. Each of the switching elements $Q_T$ and $Q_B$ is constituted with a MOSFET of a p-type channel 3 and a MOSFET of an n-type channel 2 which are connected in series to the driver circuit 12, a CMOS logic inverter (including a MOSFET of a p-type channel 4 and a MOSFET of an n-type channel 5) connected in series to the driving source power 12 receiving a voltage from a drain region or terminal shared between the MOSFETs 2 and 3, and a resistor 6 arranged between the drain region and a source region of the MOSFET 2. A gate terminal of the MOSFET 3 is connected to a positive polarity terminal of the control power source 11 such that a voltage discrepancy between a voltage Vcc of the driving power source 12 and a voltage $V_{DD}$ of the control power source 11 is applied between a gate region and a source region of the MOSFET 3. Moreover, a logic signal produced from the control circuit 7 with a voltage amplitude $V_{DD}$ is applied between a gate region and the source region of the MOSFET 2.

In the signal level converter circuits 1-1 and 1-2, with the voltage difference (Vcc - $V_{DD}$) applied between the gate and source regions of the MOSFET 3, when a high-level logic signal (with a voltage amplitude $V_{DD}$) produced by the control circuit 7 is applied between the gate and source regions of the MOSFET 2, a potential of the drain terminal shared between the MOSFETs 3 and 2 is set to a low level (0 V) and hence the CMOS logic inverter outputs a high-level signal (Vcc). On the other hand, in the situation, when a low-level logic signal (0 V) is applied between the gate and source regions of the MOSFET 2, the CMOS logic inverter outputs a low-level signal (0 V).

As above, according to the operations of the signal level converter circuits 1-1 and 1-2, when the driving source power 12 and the control power source 11 respectively develop voltages respectively within predetermined ranges, the voltage amplitude of the signal outputted from the control circuit 7 is amplified to be delivered to the driver circuit 8 and/or the level shift circuit 9. In this regard, the output logic values of the level converter circuits 1-1 and 1-2 respectively associated with the on states of the switching elements $Q_B$ and $Q_T$ are appropriately determined to achieve the object of the present invention i.e. to prevent the simultaneous activation of these switching elements $Q_B$ and $Q_T$ due to an undefined logic state caused by an increased voltage of the driving power source 12 and/or the control power source 11. In this embodiment, the output logic of each of the level converter circuits 1-1 and 1-2 is decided such that the switching element $Q_B$ is turned on when the output from the level converter circuit 1-1 is at a high level and the switching element $Q_T$ is turned on when the output from the level converter circuit 1-2 is at a low level. More concretely, the driver circuits 8 and 10 and the level shift circuit 9 are configured so that either one of the switching elements $Q_B$ and $Q_T$ is turned on according to a positive logic of an output from the associated level converter circuit and the other one thereof is turned on in accordance with a negative logic of the output therefrom.

Figure 2A:
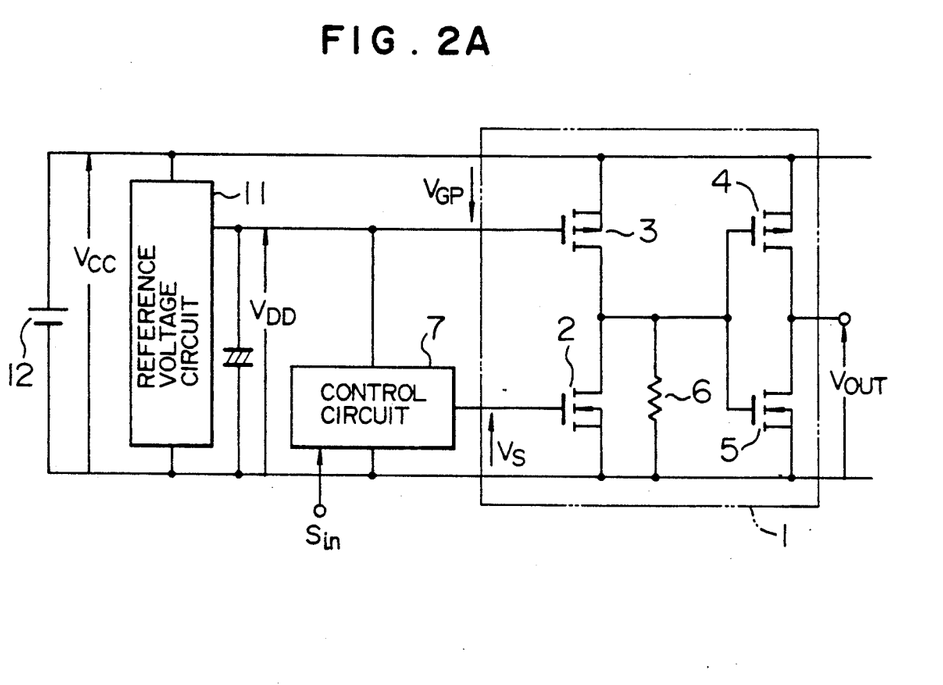
FIG. 2A is a schematic diagram showing the electric circuit constitution of substantially a portion of the inverter of FIG. 1.

Referring now to FIGS. 2A to 2C, description will be given of the operation principle of the signal level converter circuits 1-1 and 1-2. FIG. 2A basically shows, for convenience of explanation, a portion of the circuit constitution of FIG. 1. In FIG. 2A, the construction of the level converter circuit 1 is substantially identical to that of the circuit 1-1 or 1-2 of FIG. 1. It is assumed in this circuit constitution, a voltage developed across the gate and source regions of the MOSFET of the p-type channel 3 is represented as $V_{GP}$, a voltage supplied from the control circuit 7 to be applied between the gate and source regions of the MOSFET of the n-type channel 2 is denoted as $V_s$, and the output voltage developed by the CMOS inverter is designated as Vout. The difference between the structure of FIG. 2A and that of FIG. 1 resides in the reference voltage circuit 11 disposed as a controlling power source $V_{DD}$. In FIG. 1, the control driving power source 11 is separated from the driving power source 12; whereas, in FIG. 2A, the reference voltage circuit 11 is powered by the driving power source 12 to produce a control voltage $V_{DD}$ less than the driving voltage Vcc, the control voltage $V_{DD}$ being independent of a variation in the voltage Vcc under a condition of Vcc>$V_{DD}$.

Figure 2B:
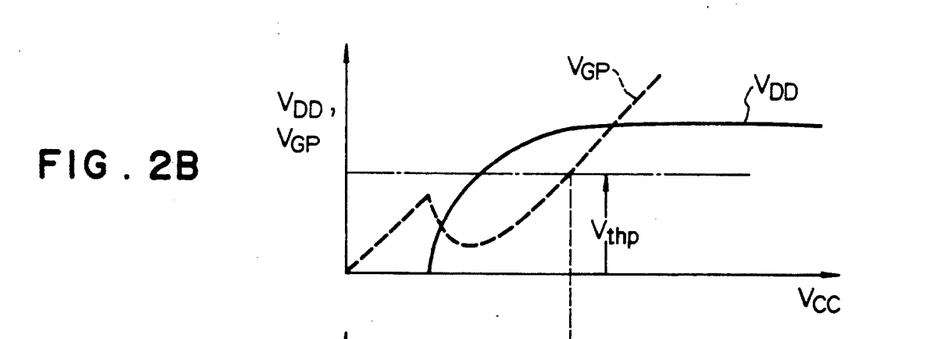
FIGS. 2B and 2C are graphs showing operations of a signal level converter circuit of FIG. 2A.

FIG. 2B shows relationships between Vcc and $V_{DD}$ and those between Vcc and the difference therebetween $V_{GP}$(=Vcc−$V_{DD}$). In this example, as shown in this graph, the value of $V_{DD}$ has an offset, and so $V_{DD}$ is 0 V in a range where Vcc takes a small value. In a range exceeding the offset value, the value $V_{DD}$ exponentially increases with respect to Vcc to a saturated state of a fixed voltage. During the period of time when the value of $V_{DD}$ exponentially increases, the voltage source is not completely established for the logic of the control circuit 7. Namely, the system is in the undefined state of logic operations. In this embodiment, in order to determine whether or not the voltages respectively of $V_{DD}$ and Vcc have been established, there is adopted a voltage difference $V_{GP}$ therebetween. Relationships therebetween is obtained as a characteristic curve of FIG. 2B. In a period when neither $V_{DD}$ nor Vcc is definitely established, $V_{GP}$ is set a value not exceeding a gate threshold voltage Vthp of the MOSFET 3 denoted by a dot-and-dash line.

Figure 2C:
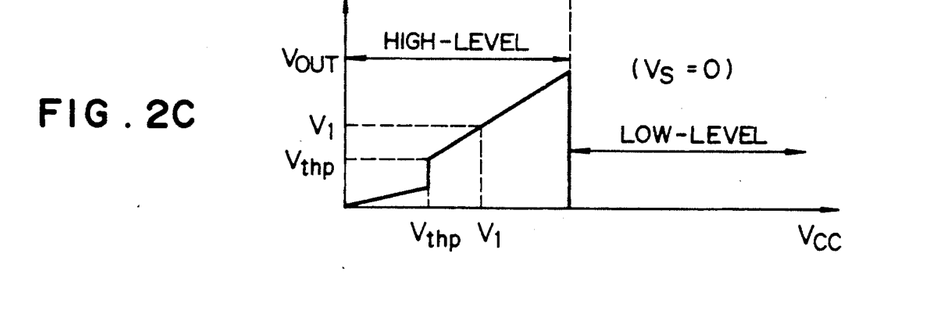

Subsequently, FIG. 2C shows relationships between Vcc and the output voltage Vout from the CMOS inverter. In FIG. 2C, it is assumed that a logic signal Vs applied from the control circuit 7 to the gate region of the MOSFET 2 is at a low level i.e. 0 V. As a result, the MOSFET 2 is set to the off state; moreover, the MOSFET 3 is also in the off state in a range $V_{GP}$<Vthp. In this situation, since the value of the resistor 6 connected in series to the MOSFET 2 is less than that of the MOSFET 2 in the off state, the gate voltage of each CMOS inverter (MOSFETs 4 and 5) is set to a low level. Resultantly, as shown in FIG. 2C, the output Vout therefrom is set to a high level in a range where Vcc is greater than the gate threshold voltage Vthp of the MOSFET 4. In FIG. 2C, in a range defined by Vcc>Vthp and $V_{GP}$<Vthp, the voltage Vout is substantially equal to Vcc. This means that Vout takes a high-level value regardless of the signal Vs from the control circuit 7.

The value of Vthp is determined as follows. Namely, when $V_{DD}$ increases in association with an increase in Vcc so that when $V_{DD}$ becomes to be equal to or more than a voltage value necessary to establish the logic of the control circuit 7, the condition of $V_{GP}$>Vthp is satisfied. This consequently turns the MOSFET 3 on. Since the resistance thereof in this state is less than that of the resistor 6, the gate voltage of the CMOS inverter is set to a high level and Vout is set to a low level as instructed by the control circuit 7.

As described above, according to the embodiment, the output voltage Vout produced by the signal level converters 1-1 and 1-2 keeps a high level regardless of the signal Vs from the control circuit 7 in the range of $V_{GP}$<Vthp where the power sources 11 and 12 are not definitely established. In this period, the transistor $Q_B$ to be driven according to the positive logic in the inverter of FIG. 1 is set to on, whereas the transistor $Q_T$ to be driven according to the negative logic is kept remained in the off state. This consequently prevents these transistors from being simultaneously driven to be turned on.

Figure 3A:
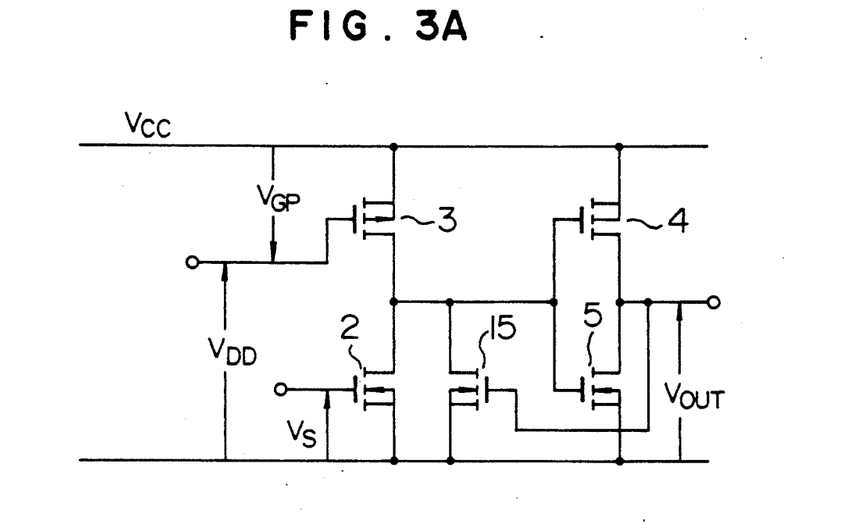
FIG. 3A is a schematic diagram showing the electric circuit constitution of another signal level converter circuit.

Next, FIGS. 3A to 3C show another embodiment of the signal level converters 1-1 and 1-2 and the operation principle thereof. In the construction of FIG. 3A, the MOSFET of the p-type channel 3, the MOSFET of the n-type channel 2, and the CMOS inverter (transistors 4 and 5) are connected to each other in the same manner as for the embodiment of FIG. 2A. Moreover, like in FIG. 2A, a voltage between the gate and source regions of the MOSFET 3 is represented as $V_{GP}$, a voltage supplied from the control circuit 7 an to be applied between the gate and source regions of the MOSFET 2 is denoted as Vs, and the output voltage developed by the CMOS inverter is designated as Vout. The configuration of FIG. 3A differs from that of FIG. 2A in that a MOSFET of an n-type channel 15 is disposed in place of the resistor 6 connected in parallel between the drain and source regions of the MOSFET 2. A gate terminal disposed in the MOSFET 15 is connected to the output terminal of the CMOS inverter.

Figure 3B:
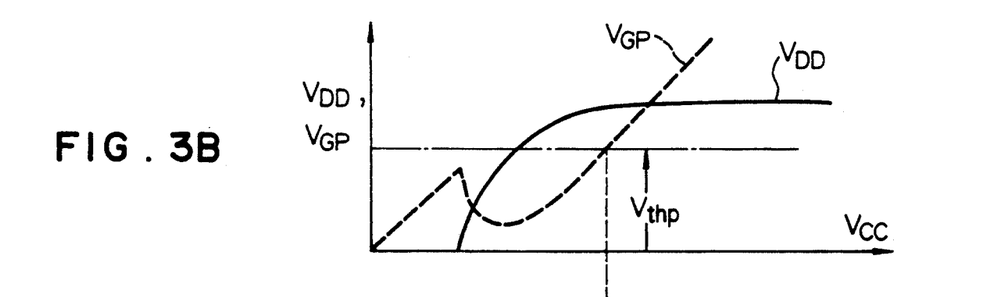
FIGS. 3B and 3C are graphs illustratively showing operations of the signal level converter of FIG. 3A.

Relationships between Vcc, $V_{DD}$, and $V_{GP}$ of FIG. 3B are the same as those of FIG. 2B and hence a redundant description thereof will be avoided.

Figure 3C:
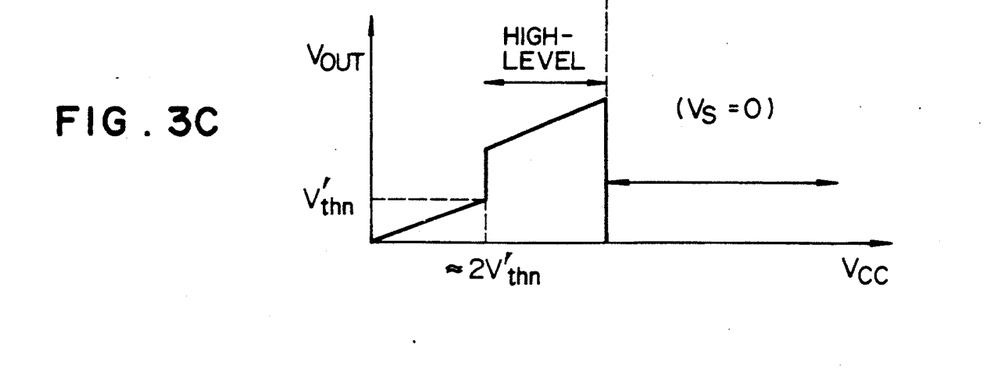

Relationships between the output voltage Vout of the CMOS inverter and Vcc shown in FIG. 3C is different from those of FIG. 2C. It is also assumed, like in FIG. 2C, that the logic signal Vs applied from the control circuit 7 to the gate region of the MOSFET 2 is at a low level.

In the graph of FIG. 3C, since the logic signal Vs is at a low level, the MOSFET 2 is off; moreover, the MOSFET 3 is also in the off state in the range $V_{GP}<$Vthp shown in FIG. 3B. In this situation, when the MOSFET 15 is off, the gate voltage of the CMOS inverter (transistors 4 and 5) is not fixed either to a high level nor to a low level, namely, the output Vout is in an undefined state between 0 V and Vcc. However, as the voltage Vcc of the driving power source increases, the output Vout becomes greater such that when Vout exceeds the gate threshold voltage Vthn' of the MOSFET 15, the MOSFET 15 is turned on. As a result, the gate terminal of the CMOS inverter is set to a low-level potential and hence the undefined state of the output Vout is changed to be fixed to a high level. The high level state of Vout is kept retained, like in the case of FIG. 2C, until the voltages of the driving power source 12 and the reference voltage circuit 11 are established according to the condition $V_{GP}>$Vthp.

For simplicity of explanation, it is assumed that while the output Vout is being in the undefined state between 0 V and Vcc, the voltage Vcc is equally divided by the MOSFETs 4 and 5 so as to develop Vcc/2 as the output Vout. On this assumption, there is obtained a characteristic curve of the output Vout in the embodiment above as shown in FIG. 3C. Namely, the Vout is kept remained at a high level irrespective of the logic signal Vs during the period defined by Vcc>2Vthn' and $V_{GP}<$Vthp. This period is different from that of FIG. 2C.

As above, the output Vout from the signal level converter circuit remains at a high level irrespective of the logic signal Vs from the control circuit 7 in the range defined by Vcc>2Vthn' and $V_{GP}<$Vthp where the power source voltages are not completely established. In this period, the transistor $Q_B$ to be driven according to the positive logic in the inverter of FIG. 1 is set to on, whereas the transistor $Q_T$ to be driven according to the negative logic is in the off state. This consequently prevents these transistors from being simultaneously driven to the on state.

In the construction of FIG. 2A, after the MOSFET 3 is turned on, an associated current flowing therethrough is fed to the resistor 6. To save the power consumption of this circuit system, a considerably high resistance value is required to be set to the resistor 6. In this connection, the structure of FIG. 3A includes the MOSFET 15 in place of the resistor 6 and hence is suitably applicable to the IC manufacturing process.

Description has been given of the signal level converter circuits preventing the simultaneous activation of the switching elements $Q_B$ and $Q_T$ respectively of the upper and lower arms of the inverter due to an undefined logic state of the control circuit 7 caused by a low voltage of the driving power source 12 and the control power source 11. Description will now be given of other operations of the signal level converter circuits 1-1 and 1-2 in the embodiment.

Figure 4A:
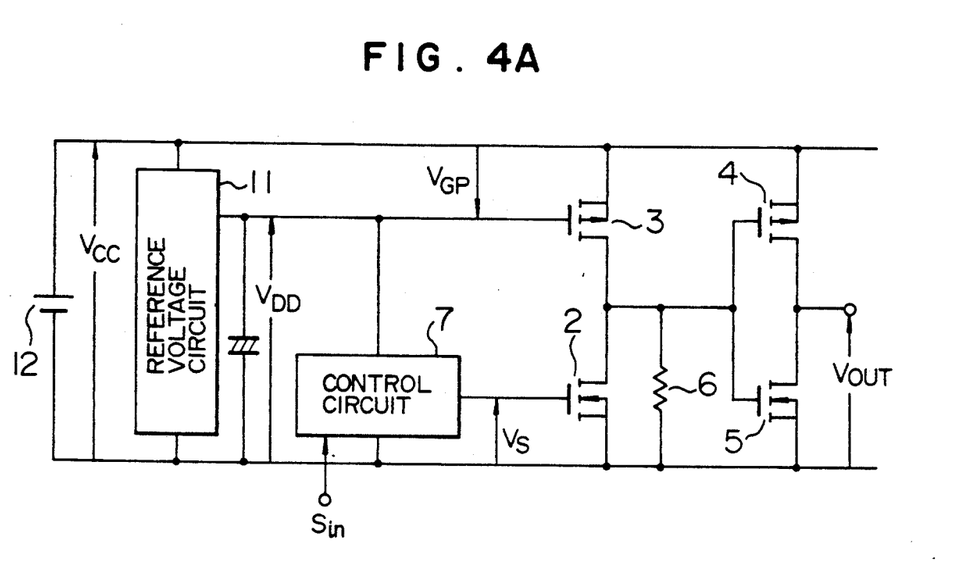
FIG. 4A is a diagram showing the electric circuit constitution identical to that shown in FIG. 2A.
Figure 4B:
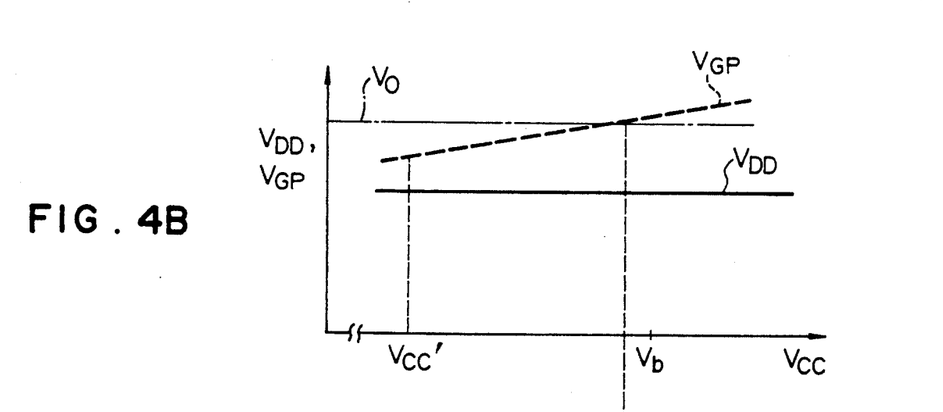
FIGS. 4B and 4C are graphs useful to explain other operations of the signal level converter circuit above.
Figure 4C:
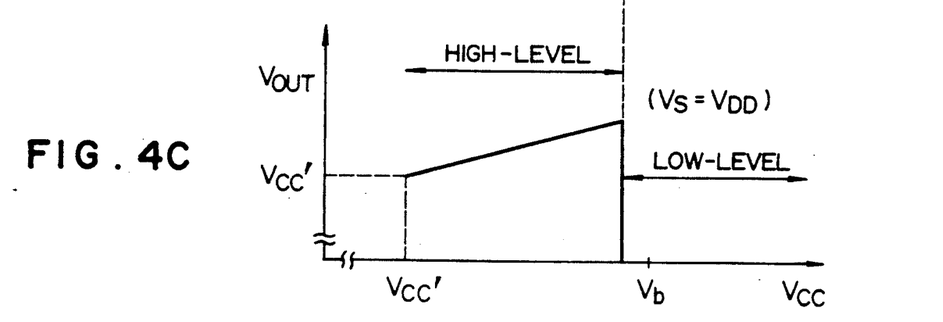

FIGS. 4B and 4C show the operation principle of the signal level converter circuits 1-1 and 1-2 in which either one of the upper and lower arm switching elements $Q_B$ and $Q_T$ is turned off when the voltage of the driving power source 12 becomes to be equal to or more than a allowable limit value.

The circuit constitution of FIG. 4A is identical to that shown in FIG. 2A. This diagram is adopted for convenience of description in conjunction with FIGS. 4B and 4C. FIG. 4B shows, like FIG. 2B, relationships between the driving power source voltage Vcc and the output voltage $V_{DD}$ of the reference voltage circuit and those between the Vcc applied between the gate and source regions of the MOSFET of the p-type channel and the voltage difference $V_{GP}$.

In the graphs of FIGS. 4B and 4C, Vcc' and Vb respectively denote a rated output voltage and an allowable limit voltage of the driving power source 12. Before explaining the operation of the embodiment, description will now be given of the voltage Vb of the driving power source 12.

In general, in an element of a voltage-driving type such as a power MOSFET or an IGBT, the higher the driving voltage applied to a gate terminal thereof is, the lower is the turn-on resistance of the element, which advantageously decreases the loss in the system. Moreover, each of these element has a saturation current determined by the gate voltage, namely, the current flowing therethrough is limited. Consequently, in an accident such as a short circuit established in a load, there can be developed a self-support function of limiting the current flowing therethrough. However, when the gate voltage is excessively high, the saturation current also takes a large value, which leads to danger of an excessive current flowing when the load is short-circuited. In addition, the breakdown voltage between the gate and source regions of each of these elements (the gate and emitter regions in the case of the IGBT) is less than that between the drain and source regions thereof (the collector and emitter regions of the IGBT). Namely, an excessively high gate voltage deteriorates reliability of the element. Accordingly, the upper-limit gate voltages are determined depending on the reasons above, thereby employing the lower value thereof as the allowable limit voltage.

In the graph of FIG. 4B, the output voltage $V_{DD}$ of the reference voltage circuit 11 increases, as shown in FIG. 2B, in an exponential manner with respect to Vcc in the setup stage of Vcc i.e. until Vcc is set to a sufficiently large value. With the sufficient Vcc, the output voltage $V_{DD}$ is fixed to a constant value. Thereafter, the value of $V_{DD}$ is kept remained at the value even when Vcc is further increased. This graph shows a state where $V_{DD}$ remains at a fixed value. Alternatively, even when $V_{DD}$ is other than the voltage supplied from the reference voltage source 11, for example, when $V_{DD}$ is supplied from an independent voltage source as shown in FIG. 1, substantially the same characteristic is attained.

The voltage difference $V_{GP}$ between Vcc and $V_{DD}$ increases when Vcc becomes to be greater as indicated with a broken line in FIG. 4B. It is assumed that $R_p$ denotes the turn-on resistance of the MOSFET 3 with $V_{GP}$ applied between the gate and source regions, Rn designates the turn-on resistance of the MOSFET 2 with the high-level logic voltage (Vs=$V_{DD}$) applied thereto from the control circuit 7, and R6 stands for the resistance value of the resistor 6. As already described in conjunction with FIG. 2C, since the output voltage Vout from the signal level converter circuits 1-1 and 1-2 is set to a high level when a high-level logic signal is applied thereto from the control circuit 7, the $R_p$ inherently takes a value higher than the parallel resistance value of Rn and R6. However, the $R_p$ decreases as the $V_{GP}$ increases such that the $R_p$ becomes to be less than the parallel resistance value of Rn and R6. Assume that the value of $V_{GP}$ at this point of time is represented as $V_0$. In this embodiment, the MOSFETs 2 and 3 are selected such that the value of Vcc developed when the $V_{GP}$ becomes to be $V_0$ is larger than the rated voltage Vcc' and is less than the allowable limit voltage Vb.

With the provision above, the signal level converter circuits 1-1 and 1-2 carry out operations as shown in FIG. 4C. This graph shows a state in which a high-level logic voltage is applied from the control circuit 7 to the gate terminal of the MOSFET 2. Although the output Vout is inherently set to a high level (Vout=Vcc), the Vout is kept remained at a low level regardless of the logic voltage supplied from the control circuit 7 in the range $V_{GP}>V_0$.

As above, in the signal level converter circuits 1-1 and 1-2 of this embodiment, before the Vcc reaches the allowable limit voltage Vb, the outputs from the signal level converter circuits 1-1 and 1-2 respectively associated with the positive and negative side switching elements $Q_B$ and $Q_T$ are set to a low level to set either one of the elements i.e. the element operating in the positive logic to the off state, thereby interrupting the output from the inverter.

Figure 5:
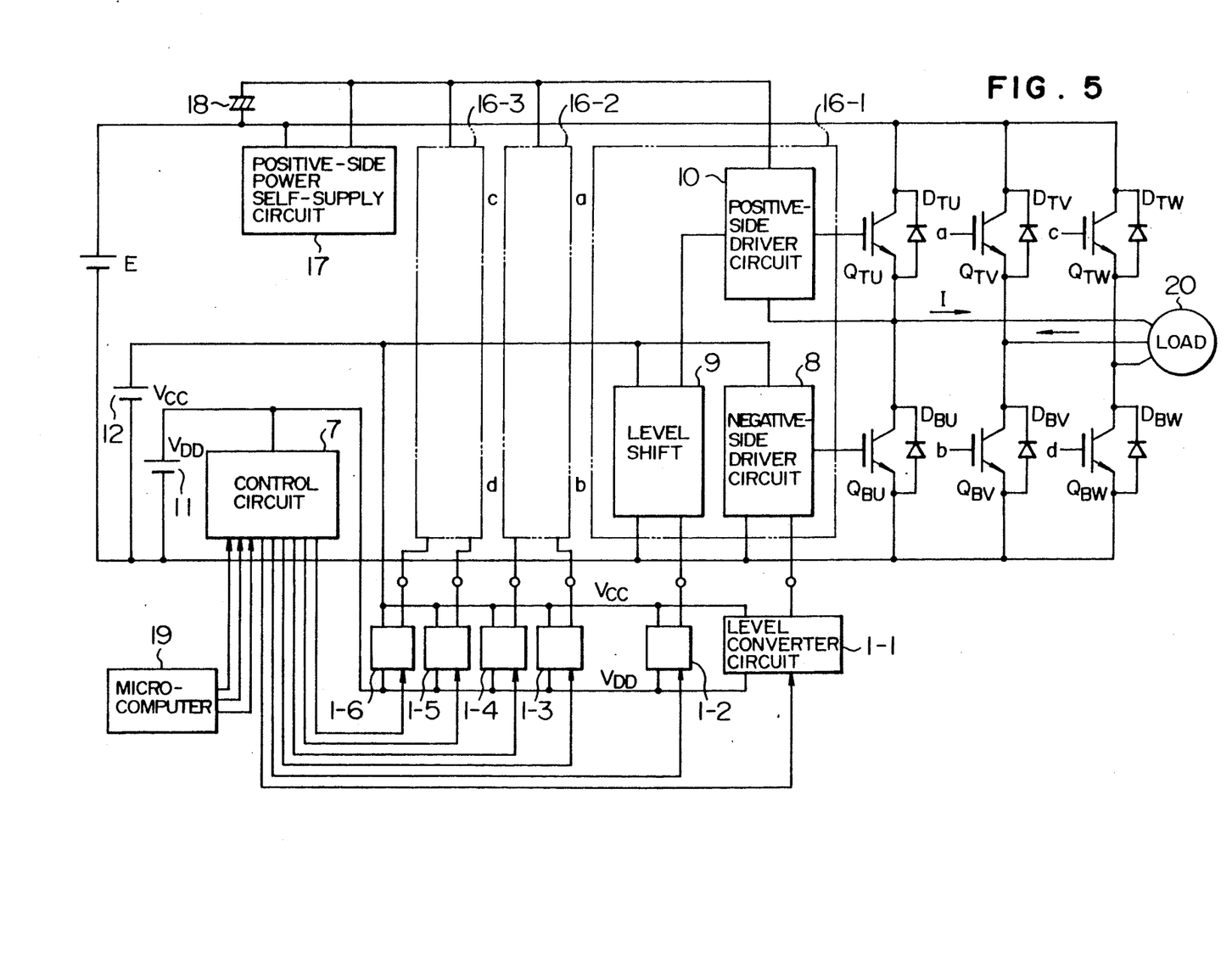
FIG. 5 is a diagram schematically showing the electric circuit constitution of an inverter in another embodiment according to the present invention.
Figure 6A:
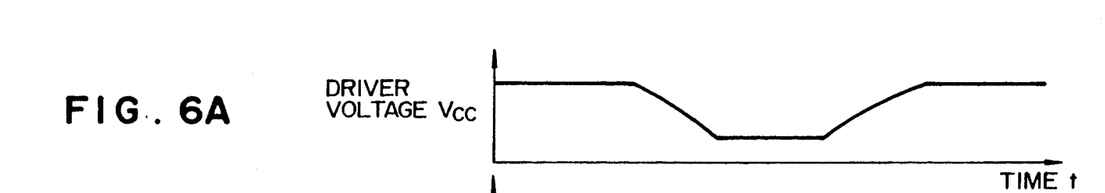
FIGS. 6A to 6H are graphs showing operations of the inverter of FIG. 5.
Figures 6B, 6C:
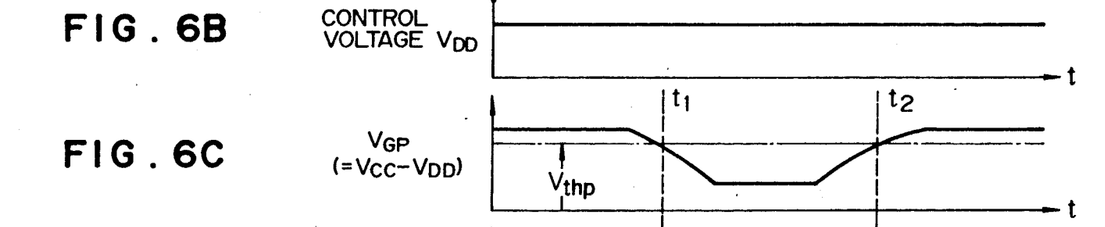
Figure 6D:
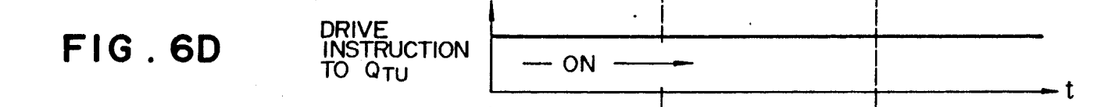
Figure 6E:
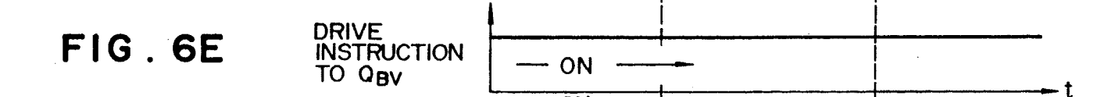
Figure 6F:
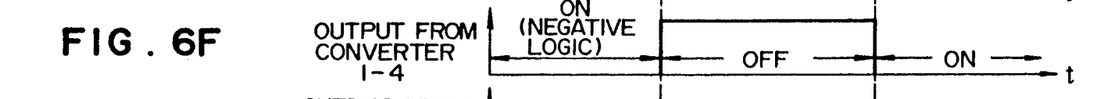
Figure 6G:
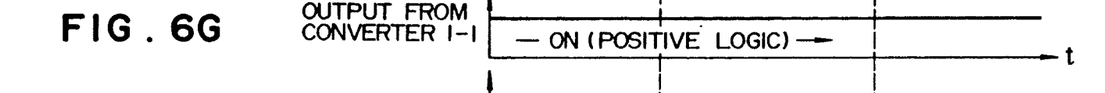
Figure 6H:
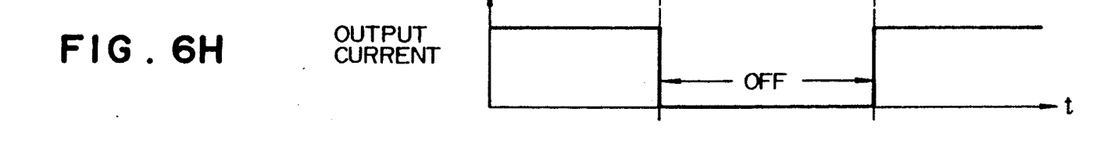
Figure 7A:
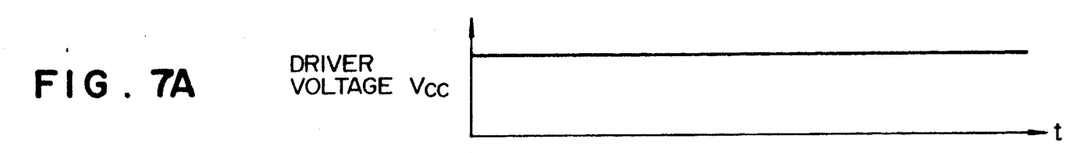
FIGS. 7A to 7H are graphs showing other operations of the inverter of FIG. 5.
Figure 7B:
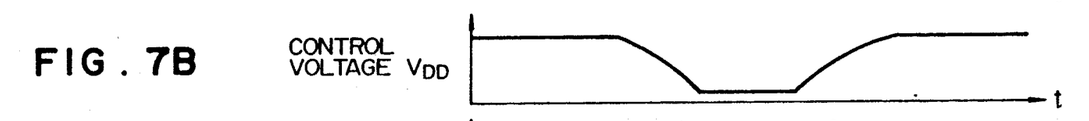
Figure 7C:
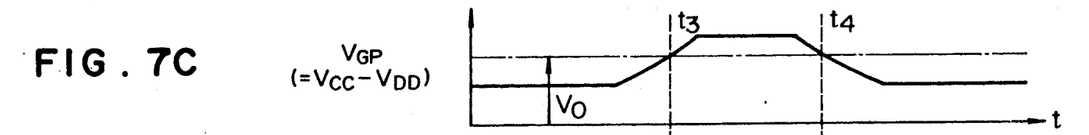
Figure 7D:
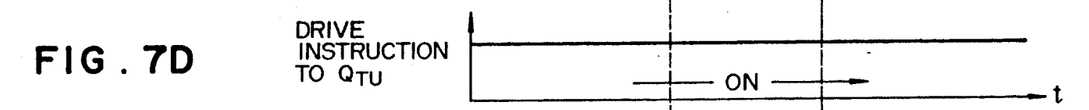
Figure 7E:
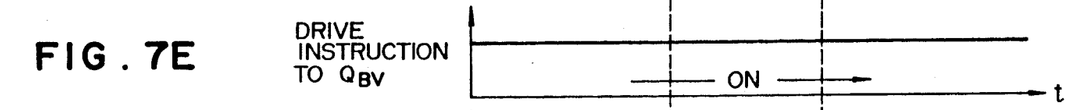
Figure 7F:
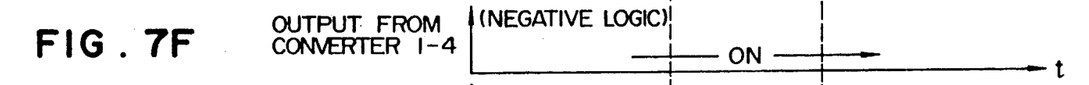
Figure 7G:
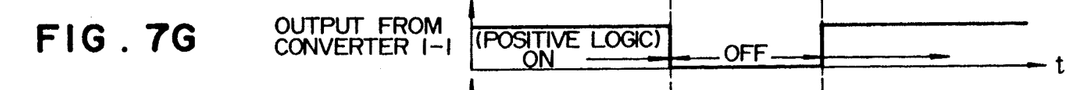
Figure 7H:
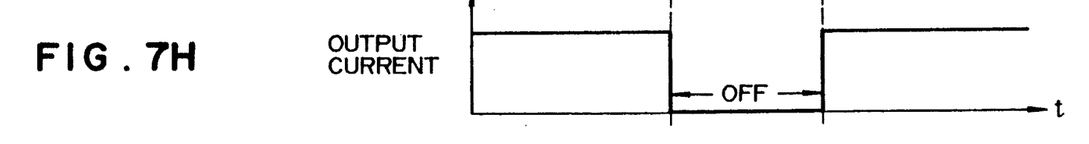

FIG. 5 is a circuit configuration diagram showing an application example in which the present invention is applied to a three-phase inverter. In this diagram, a negative-side driver circuit 8, a level shift circuit 9, and a positive-side driver circuit 10 constitute a driver circuit 16-1 for a first one of three phases. Moreover, there are disposed driver circuits 16-2 and 16-3 similarly constituted for the remaining second and third phases. A controlling power source $V_{DD}$ 11 disposed to power a control circuit 7 develops an output voltage $V_{DD}$ lower than the voltage Vcc supplied from a driving power source Vcc 12. A signal created by the control circuit 7 to drive an U-phase negative-side switching element $Q_{BU}$ is processed by a signal level converter circuit 1-1 structured in substantially the same fashion as for the converter circuit shown in FIG. 2A or 3A. Namely, the signal is converted by the level converter 1-1 into a logic signal having a voltage amplitude substantially identical to that of the driving power source Vcc 12 to be delivered to the negative-side driver circuit 8. Similarly, a signal produced to drive an U-phase positive-side switching element $Q_{TU}$ is processed by a signal level converter circuit 1-2. Namely, the signal is converted by the level converter 1-2 into a logic signal having a voltage amplitude substantially identical to that of the driving power source Vcc 12 to be delivered to the level shift circuit 9. In this constitution, the negative-side driver circuit 8 is driven in accordance with the positive logic to turn the element $Q_{BU}$ on when a high-level signal is supplied from the signal level converter 1-1; whereas, the positive-side driver circuit 10 is driven according to the negative logic to turn the element $Q_{TU}$ on when a low-level signal is received from the signal level converter 1-2. Similarly, the signal level converter circuits 1-3 and 1-5 respectively deliver driving signals to elements $Q_{BV}$ and $Q_{BW}$ in accordance with the positive logic; whereas, the signal level converter circuits 1-4 and 1-6 respectively send driving signals to elements $Q_{TV}$ and $Q_{TW}$ according to the negative logic.

A capacitor 18 is disposed as a power source shared between the positive-side driver circuits 10. A positive-side power self-supply circuit 17 is adopted as means for charging the capacitor 18. Moreover, the control circuit 7 receives as an input thereto an instruction signal from a microcomputer 19. In FIG. 5, there is shown a current I which flows from a U-phase output terminal via a load 20 to a V-phase output terminal.

Referring next to FIGS. 6A to 6H, description will be given of the operation developed with a low driving voltage by the inverter shown in FIG. 5. In FIGS. 6A to 6H, although the voltage of the driving power source Vcc is inherently kept at a fixed value, it is assumed in this operation that the voltage is decreased at an intermediate point and is then restored to the original value. In contrast thereto, the voltage of the controlling power source $V_{DD}$ is kept remained at a constant level even when the driving voltage Vcc is lowered. As a result, the gate voltage $V_{GP}$ of the MOSFET 3 in the level converter circuit 1 of FIG. 2A (where, $V_{GP}$ is substantially equal to the voltage difference between Vcc and $V_{DD}$ as described above) is lowered according to the decrease in the voltage Vcc. In these graphs, during a period ranging from $t_1$ to $t_2$, the voltage $V_{GP}$ is assumed to be equal to or less than the gate threshold voltage Vthp of the MOSFET 3.

Assuming in the graphs of FIG. 6 that signals are supplied from the microcomputer 19 to the control circuit 7 as element driving instructions to turn the elements $Q_{TU}$ and $Q_{BV}$ on, the level converter circuits 1-1 to 1-6 keep the high-level state during a period defined by $V_{GP}<V_{thp}$ irrespective of the input signals. Consequently, the output from the circuit 1-4 driven according to the negative logic is changed to a high level and hence the element $Q_{TU}$ is set to the off state. In addition, the load current I is stopped during the period above. In this connection, a motor driving a fan or the like is ordinarily connected as a load to the system. However, the inverter can be integrally arranged in the motor, and hence when the inverter is employed in an air conditioner or the like, the overall system size can be minimized.

As above, in the inverter of FIG. 5, when the voltage supplied from the driving power source is lowered, either one of the upper and lower arm output elements associated with each phase is kept remained in the off state regardless of the input signals, thereby interrupting the load current in safety.

FIGS. 7A to 7H are graphs showing operations of the inverter of FIG. 5 when the voltage $V_{DD}$ of the control power source is lowered with the voltages of the driving power sources kept remained respectively at fixed values. In this case, the gate voltage $V_{GP}$ of the MOSFET 3 increases in association with the decrease in the voltage $V_{DD}$. In the graphs of FIGS. 7a to 7H, during the period from $t_3$ to $t_4$, the voltage $V_{GP}$ is assumed to be equal to or more than the voltage $V_0$ shown in FIG. 4B. As a result, even in the state in which the signals are being supplied from the microcomputer 19 to the control circuit 7 as the element driving instructions to turn the elements $Q_{TU}$ and $Q_{BV}$ on, the level converter circuits 1-1 to 1-6 keep the high-level state during a period defined by $V_{GP}>V_0$ irrespective of the input signals as described in conjunction with FIGS. 4A to 4C. Consequently, the output from the level converter circuit 1-1 driven according to the positive logic is changed to a low level and hence the element $Q_{BV}$ is set to the off state, thereby interrupting the load current I.

As described above, in an inverter according to the present invention, in a case where the voltage of the driving power source or the control voltage source is lowered or the voltage difference between the driving power source and the control power source is equal to or less than the allowable limit value, even when an undefined state occurs in the logical operation, either one of the upper and lower arm switching elements is kept remained in the off state so as to prevent these elements from being simultaneously activated to be turned on. This leads to an advantage of an increase in the safety of the inverter.

While particular embodiments of the invention have been shown and described, it will be obvious to those skilled in the art that various changes and modifications may be made without departing from the present invention in its broader aspects.

We claim:

1. An inverter comprising:
   a first dc voltage source;
   a first switching element and a second switching element which are connected in series to said first dc voltage source;
   a second dc voltage source;
   a third dc voltage source developing an output voltage lower than an output voltage produced from said second dc voltage source;
   a signal generator means for producing a first control signal and a second control signal on the basis of the output voltage from said third dc voltage source;
   first signal level converter means for converting a voltage level of the first control signal based on the output voltage from said second dc voltage source and thereby generating a first output signal;
   second signal level converter means for converting a voltage level of the second control signal based on the output voltage from said second dc voltage source and thereby generating a second output signal;
   first driver means responsive to the first output signal for supplying said first switching element with a first driving signal on the basis of the output voltage from said second dc voltage source and thereby turning said first switching element on or off; and
   second driver means responsive to the second output signal for supplying said second switching element with a second driving signal on the basis of the output voltage from said second dc voltage source and thereby turning said second switching element on or off,
   at least either one of said first and second signal level converter means including turn-off means responsive when at least either one of the output voltages respectively from said second and third dc voltage sources is lower than a predetermined voltage level for turning said first or second switching element off irrespective of the first and second control signals.

2. An inverter according to claim 1, wherein said turn off means includes means responsive when a voltage difference between the output voltages respectively from said second and third dc voltage sources is equal to or less than a first predetermined value for turning said first or second switching element off regardless of the first and second control signals.

3. An inverter according to claim 1, wherein either one of said first and second signal level converter means includes turn-off means responsive when voltage difference between the output voltages respectively from said second and third dc voltage sources is equal to or more than a second predetermined value for turning said first or second switching element off regardless of the first and second control signals.

4. An inverter according to claim 1, wherein said turn-off means includes a MOSFET having a p-type channel and a MOSFET having an n-type channel which are connected in series to said second dc voltage source,
   a voltage difference between the output voltages respectively from said second and third dc voltage sources being applied between a gate electrode and a source electrode of said MOSFET of the p-type channel,
   the first or second control signal being applied between a gate electrode and a source electrode of the MOSFET of the n-type channel.

5. An inverter according to claim 4, wherein said turn-off means includes a resistor connected in parallel between a drain electrode and the source electrode of said MOSFET of the n-type channel.

6. An inverter according to claim 4, wherein said turn-off means includes a MOSFET connected in parallel between the drain and source electrodes of said MOSFET of the n-type channel.

* * * * *